United States Patent Office 3,024,187
Patented Mar. 6, 1962

3,024,187
PLATINUM-CATALYST HYDROFORMING PROCESS
Walker F. Johnston, Jr., La Marque, and Irvin F. Teykl, Houston, Tex., assignors, by mesne assignments, to Standard Oil Company, Chicago, Ill., a corporation of Indiana
No Drawing. Filed Feb. 20, 1959, Ser. No. 794,509
8 Claims. (Cl. 208—138)

This invention relates to the hydroforming of hydrocarbon naphthas with platinum catalyst and, more specifically, to an improved method of operation which substantially decreases catalyst deactivation rates and increases cycle lengths, particularly at lower hydroforming pressures.

Platinum-alumina catalysts are widely employed in the petroleum industry today for reforming petroleum naphthas to substantially higher octane levels. Although lower operating pressures increase hydroformate and hydrogen yields and increase the ceiling-octane capability of such processes, commercial operations are still limited today to pressures above about 225 pounds per square inch gauge. One of the principal difficulties which has heretofore prevented economic reforming at lower pressures has been the greatly-accelerated catalyst deactivation rates encountered at lower pressures. Moreover, these high deactivation rates are greatly magnified when employing hydroforming conditions effective for producing reformates having CFR–R unleaded octane numbers in excess of about 95. Even when the reforming process includes facilities capable of regenerating platinum catalyst, regeneration frequency is so excessive at lower pressures that effective catalyst life is substantially reduced.

We have now discovered an improved operating technique which substantially reduces deactivation rates, particularly at lower hydroforming pressures, and thus makes such operations economically feasible. It is accordingly an object of this invention to raise reformate and hydrogen yields and ceiling octane numbers for platinum catalyst reforming processes. It is a more specific object of this invention ot decrease the octane-decline rate of platinum catalysts, particularly when reforming naphthas at pressures below about 225 pounds per square inch gauge. It is a still further object of this invention to increase the cycle length and effective life of platinum catalyst when reforming to octane levels above about 95 at reforming pressures below about 225 pounds per square inch gauge. These and other objects of the present invention will be apparent from the following detailed description and claims.

It has now been discovered that the overall performance of platinum-alumina catalysts in the hydroforming of petroleum naphthas can be greatly improved by subjecting the catalyst to a preliminary conditioning for a period in excess of about 10 hours, e.g., about 10 to 100 hours or more, in a hydroforming operation at a pressure of at least about 50 pounds per square inch, e.g., 50 to 150 pounds per square inch, above the desired pressure to be employed in the ensuing hydroforming operation and thereafter dropping the pressure to the desired pressure. By operating initially at substantially higher pressure, the activity maintenance of the catalyst during the ensuing hydroforming cycle is substantially improved.

The method of the present invention is especially useful in connection with treatment of both virgin and cracked naphthas to produce hydroformates having CFR–R unleaded octane numbers above about 95, e.g., 100 or higher. In order to reach this level of product quality the hydroforming operation is best carried out at a pressure within the range of about 50 to 500 pounds per square inch gauge, a temperature between about 900 and 1050° F., e.g., 920 to 1000° F., an hourly weight space velocity between about 0.5 and 5.0 and a hydrogen input rate between about 1000 and 10,000 standard cubic feet per barrel of charge stock. At the lower reforming pressures, yield of reformate and hydrogen and octane potential are substantially higher. For example, when reforming at 200 pounds per square inch gauge as compared with 300 pounds per square inch gauge, other conditions being held constant, octane is increased by as much as two units, reformate yield by about 2 volume percent, and hydrogen yield by more than 100 standard cubic feet per barrel of naphtha charge. Unfortunately, octane decline rate is more than doubled, and cycle length is cut by more than half. If, however, the catalyst is first pretreated in accordance with the present invention by initially contacting it when fully active, i.e., when new or freshly regenerated, under hydroforming conditions at substantially higher pressure, e.g., 300 pounds per square inch gauge, the subsequent operation at 200 pounds per square inch gauge can be carried out without any substantial penalty with respect to octane decline and/or cycle length.

The hydrocarbon stock employed in the catalyst pretreating step may suitably and preferably be the petroleum naphtha subsequently to be employed in the hydroforming operation. Alternatively it may be another petroleum fraction in the naphtha-boiling range or a hydroformed naphtha or a fraction thereof, or a mixture of such materials. The charging stock should have an ASTM boiling range end point below about 450° F., preferably below about 400° F., and should be low in sulfur (less than about 0.03 weight-percent) and other contaminants. Paraffin and aromatic hydrocarbon diluents can be added if desired.

The improvement of the present invention is suitable for use with both regenerative and non-regenerative reforming processes such as are employed commercially today and with any of the alumina-supported platinum hydroforming catalysts described in the prior art, including unpromoted platinum-on-alumina, as well as platinum-alumina catalysts which contain other additives such as vanadia, chromia, titania, iridium, rhodium, an oxide of phosphorus, boria, silica, fluorine, chlorine, or the like, and mixtures thereof. The catalysts commonly contain platinum in a proportion between 0.05 and 1 percent by weight, based on dry $Al_2O_3$. Third components are usually present in a proportion between about 0.1 and 10 percent by weight.

In a preferred embodiment of the present invention a petroleum naphtha is contacted with an initially-fully-active platinum-on-alumina catalyst under hydroforming conditions effective for producing a hydroformate having a CFR–R unleaded octane number above about 95, said conditions including a hydroforming pressure between about 275 and 500 pounds per square inch gauge, e.g., 300 pounds per square inch gauge, for a period of at least about 10 hours; and thereafter hydroforming pressure is lowered to the range of about 50 to 225 pounds per square inch gauge, e.g., 200 pounds per square inch gauge, whereby the octane-decline rate of the platinum-on-alumina catalyst at the lower hydroforming pressure is substantially reduced. When practicing the invention, it is sometimes also desirable to lower hydroforming temperature prior to, simultaneously with, or after dropping pressure. Since the method of the present invention results in a higher average octane number than would otherwise be obtained, the same quality product can be obtained at lower temperature. Lowering temperature would, of course, increase reformate yields and increase cycle length still further.

We are uncertain as to the precise mechanism whereby the advantageous results of the preconditioning operation are achieved. The technique is not an equivalent of rerunning, acid treating, clay treating, silica-gel treating, or any of the other methods commonly employed for removing contaminants from petroleum stocks, since such methods do not produce the improved activity maintenance typical of the invention. Whatever the mechanism of the invention, the pretreating step is effective in prolonging the useful cycle life of platinum-alumina catalysts.

The invention will be more fully understood from the following operating example:

Example

Two runs were carried out in a hydroforming pilot-plant reactor, which runs resulted in comparative data which clearly illustrate the advantages of the present invention. The first run was carried out by the method of the prior art, that is, the same pressure, i.e., 200 pounds per square inch gauge, was employed throughout the run. In the second run the improvement of the present invention was employed, that is, a higher hydroforming pressure, i.e., 300 pounds per square inch gauge, was employed during the first part of the run and then pressure was reduced to 200 pounds per square inch gauge for the remainder of the run.

For each run aliquot samples of the same new platinum-alumina catalyst were employed. The catalyst contained about 0.6 weight percent platinum and about 0.6 weight percent chloride on a gamma-alumina base. For each run a weight-hourly space velocity of 1.0, a reactor temperature of 925° F., and a hydrogen input of 3,500 standard cubic feet per barrel of naphtha were employed. For each run the charge stock was a naphtha from a Tia Juana crude source, having the following inspections.

ASTM distillation, ° F.:
IBP _____ 238
10% _____ 254
30% _____ 270
50% _____ 290
70% _____ 314
90% _____ 356
FBP _____ 402
Gravity, ° API _____ 52.4
Octane number, unleaded CFR-R _____ 47.7
Octane number, unleaded CFR-M _____ 48.0
Sulfur, wt. percent _____ 0.02
Nitrogen, p.p.m. _____ 4
Chloride, p.p.m. _____ 8
Type analysis, vol. percent:
  Paraffins _____ 45
  Olefins _____ 1
  Naphthenes _____ 40
  Aromatics _____ 14

The reformate product obtained from each run was collected and analyzed with the following results:

| Hours: | 1st run: Constant low pressure | | 2nd run: High-low pressure | |
|---|---|---|---|---|
| | Pressure p.s.i.g. | CFR-R octane, unleaded | Pressure p.s.i.g. | CFR-R octane, unleaded |
| 0–20 | 200 | 100.0+ | 300 | 99.6 |
| 20–40 | 200 | 99.4 | 300 | 99.3 |
| 40–60 | 200 | 98.7 | 300 | 99.0 |
| 60–80 | 200 | 98.2 | 300 | 98.7 |
| 80–100 | 200 | 97.5 | 300 | 98.4 |
| 100–120 | 200 | 96.9 | 200 | 99.7 |
| 120–140 | 200 | 96.3 | 200 | 99.2 |
| 140–160 | 200 | 95.6 | 200 | 98.8 |
| 160–180 | 200 | 95.0 | 200 | 98.5 |
| 180–200 | 200 | 94.4 | 200 | 98.2 |
| Avg. octane for 0–200 hours | | 97.2 | | 98.9 |

The above data for the two runs clearly illustrate the decreased octane decline when employing the improvement of the present invention. While initial octane number was lower during the second run the octane-decline rate was so reduced that the average octane number was 1.7 units higher. During the first run the octane-decline rate was almost 0.03 unit per hour. In contrast, during the second run the octane-decline rate during the first 100 hours was only 0.012 unit per hour (as would be expected because of the higher pressure) but during the second 100 hours at 200 pounds per square inch gauge the octane-decline rate was a surprisingly low 0.015 unit per hour. In addition, both reformate and hydrogen yields during the second 100 hours were higher. Moreover, if temperature were lowered during the second run so as to produce the same average octane reformate as was obtained during the first run, reformate yield would be even further increased and the octane-decline rate would be even less.

As the above example illustrates, the method of the present invention raises yields and the ceiling octane capability of platinum-alumina reforming processes. In addition, it also greatly decreases the octane-decline rate (and frequency of regeneration), particularly at lower reforming pressures, and increases cycle length and the effective life of platinum catalysts. It is thus apparent that the objects of the present invention have been achieved.

While we have described our invention with reference to certain specific embodiments thereof, it is to be understood that such embodiments are illustrative only and not by way of limitation. Numerous alternative charging stocks, catalysts, manipulative steps, and operating conditions will be apparent from the above description to those skilled in the art.

In accordance with the foregoing description, we claim as our invention:

1. In a method for hydroforming a petroleum naphtha in the presence of an alumina-supported platinum catalyst at a hydroforming pressure of between about 50 to 500 pounds per square inch gauge and obtaining therefrom a reformate having a CFR-R unleaded octane number above about 95, the improvement which comprises preconditioning said catalyst when fully active and prior to use in hydroforming petroleum naphtha by exposing said catalyst for a period of at least about 10 hours to a petroleum naphtha under hydroforming conditions at a pressure of at least about 50 pounds per square inch above the initial pressure to be employed in the ensuing hydroforming operation and thereafter dropping the pressure by said at least about 50 pounds per square inch to said initial pressure, whereby the activity maintenance of the catalyst in the ensuing hydroforming operation is substantially improved.

2. The improvement of claim 1 wherein the petroleum naphtha employed during the said preconditioning is the same as the petroleum naphtha employed during the ensuing hydroforming operation.

3. A hydroforming process which comprises preconditioning an initially-fully-active platinum-alumina catalyst by contacting with a petroleum naphtha under hydroforming conditions including a hydroforming pressure between about 275 and 500 pounds per square inch gauge for a period of at least about 10 hours and thereafter contacting a petroleum naphtha with the preconditioned platinum-alumina catalyst under hydroforming conditions effective for producing a hydroformate having a CFR-R unleaded octane number above about 95, including a hydroforming pressure between about 50 to 225 pounds per square inch gauge, whereby the hydroforming activity decline rate of said preconditioned platinum-alumina catalyst during said second contacting step is substantially decreased.

4. A hydroforming process which comprises contacting a petroleum naphtha with an initially-fully-active platinum-alumina catalyst under hydroforming conditions of temperature and pressure effective for producing a hydroformate having a CFR–R unleaded octane number above about 95, including a hydroforming pressure between about 275 and 500 pounds per square inch gauge, for a period of at least about 10 hours and thereafter lowering hydroforming pressure to the range of about 50 to 225 pounds per square inch gauge, whereby the hydroforming activity decline rate of the platinum-on-alumina catalyst at the lower petroleum naphtha hydroforming pressure is substantially reduced.

5. The process of claim 4 wherein hydroforming temperature in said lower pressure hydroforming is lowered simultaneously with said lowering of hydroforming pressure so as to produce a hydroformate having an octane number not substantially in excess of that produced prior to said lowering of hydroforming pressure.

6. A hydroforming process of increased cycle length which comprises contacting a petroleum naphtha with an initially-fully-active platinum-alumina catalyst under hydroforming conditions effective for producing a hydroformate having a preselected CFR–R unleaded octane number above about 95, said hydroforming conditions including a pressure between about 275 and 500 pounds per square inch gauge, for a period of about 10 to 100 hours and thereafter lowering both the hydroforming pressure to a pressure in the range of about 50 to 225 pounds per square inch gauge and the hydroforming temperature to a temperature effective for producing a hydroformate having said preselected CFR–R unleaded octane number, whereby the cycle length of said hydroforming process at said preselected CFR–R unleaded octane number is substantially increased.

7. In a low pressure hydroforming process wherein a petroleum naphtha is contacted with an alumina-supported petroleum catalyst at a hydroforming pressure between about 50 and 225 pounds per square inch gauge, the improvement which comprises preconditioning said catalyst when fully active and prior to said low-pressure hydroforming operation by exposing said catalyst for a period of at least about 10 hours to a petroleum naphtha under hydroforming conditions at a pressure of between about 275 and 500 pounds per square inch gauge and thereafter hydroforming a petroleum naphtha in the presence of such pre-conditioned catalyst under hydroforming pressure of at least 50 pounds per square inch below the pre-conditioning pressure, a temperature between about 900 and 1050° F., an hourly weight space velocity between about 0.5 and 5.0, and a hydrogen input rate between about 1000 and 10,000 standard cubic feet per barrel of charge stock whereby a hydroformate is produced having a CFR–R unleaded octane number above about 95.

8. A hydroforming process which comprises contacting a petroleum naphtha with an initially fully active platinum-alumina catalyst under hydroforming conditions including a hydroforming pressure between about 275 and 50 pounds per square inch gauge for a period of at least 10 hours and thereafter contacting such petroleum naphtha with the said platinum-alumina catalyst under hydroforming conditions adapted to produce a hydroformate having a CFR–R unleaded octane number above about 95, said conditions including a hydroforming pressure of between about 50 and 150 pounds per square inch less than the pre-conditioning pressure, whereby the hydroformate yield and ceiling octane capability of the platinum-alumina catalyst is raised and the octane decline rate is lowered, thereby increasing cycle length and the effective life of the platinum-alumina catalyst.

References Cited in the file of this patent
UNITED STATES PATENTS

| | | |
|---|---|---|
| 2,573,149 | Kassel | Oct. 30, 1951 |
| 2,689,208 | Murray et al. | Sept. 14, 1954 |
| 2,698,829 | Haensel | Jan. 4, 1955 |
| 2,868,718 | Johnston | Jan. 13, 1959 |
| 2,876,195 | Malo | Mar. 3, 1959 |
| 2,885,351 | Johnston | May 5, 1959 |

UNITED STATES PATENT OFFICE
CERTIFICATE OF CORRECTION

Patent No. 3,024,187                                    March 6, 1962

Walker F. Johnston, Jr., et al.

It is hereby certified that error appears in the above numbered patent requiring correction and that the said Letters Patent should read as corrected below.

Column 1, line 42, for "ot" read -- to --; column 4, line 50, after "initial" insert -- hydroforming --; line 51, before "catalyst" insert -- pre-conditioned --; column 5, line 8, strike out "petroleum naphtha" and insert the same after "the" in line 6, same column 5; column 6, line 2, before "pressure" insert -- pre-conditioning --; line 7, after "the" insert -- said --; line 11, for "charge stock" read -- petroleum naphtha charged --; same column 6, line 18, for "50" read -- 500 --.

Signed and sealed this 3rd day of July 1962.

(SEAL)
Attest:

ERNEST W. SWIDER
Attesting Officer

DAVID L. LADD
Commissioner of Patents